United States Patent [19]

Avitan et al.

[11] Patent Number: 5,558,174
[45] Date of Patent: Sep. 24, 1996

[54] DRIVE TRAIN ASSEMBLY

[75] Inventors: Isaac Avitan; Robert C. Weihe, both of Sioux City, Iowa

[73] Assignee: Schaeff, Incorporated, Sioux City, Iowa

[21] Appl. No.: 437,450

[22] Filed: May 8, 1995

Related U.S. Application Data

[62] Division of Ser. No. 188,535, Jan. 26, 1994, abandoned.

[51] Int. Cl.$^6$ ............................. B60K 1/02; B60L 11/18
[52] U.S. Cl. ........................... 180/60; 180/65.6; 74/413; 74/420
[58] Field of Search ........................... 180/60, 65.5, 65.6, 180/65.7, 291, 343, 374; 74/413, 420

[56] References Cited

U.S. PATENT DOCUMENTS

| | | |
|---|---|---|
| 3,186,506 | 6/1965 | Leach et al. . |
| 3,392,797 | 7/1968 | Gibson et al. . |
| 3,424,475 | 1/1969 | Gibson . |
| 3,469,646 | 9/1969 | O'Connor . |
| 3,804,190 | 4/1974 | Shaffer . |
| 3,827,528 | 8/1974 | Shaffer . |
| 3,901,337 | 8/1975 | Cragg ................................ 180/65.6 X |
| 3,933,217 | 1/1976 | Eichinger . |
| 3,937,293 | 2/1976 | Susdorf . |
| 4,461,367 | 7/1984 | Eichinger et al. . |
| 4,819,508 | 4/1989 | Yamaoka et al. . |
| 5,375,479 | 12/1994 | Kouno et al. ............................. 74/420 |

FOREIGN PATENT DOCUMENTS

| | | | |
|---|---|---|---|
| 126794 | 4/1959 | U.S.S.R. ................ | 180/65.6 |

OTHER PUBLICATIONS

"Caterpillar Specifications Systems Operation Testing & Adjusting, F25, F30, F35, FC40, Lift Trucks Power Train", Form No. SENB8249–02, pp. 1–33, Power Train.

Service Manual "Disassembly & Assembly, T30, T40, T50, T60, M30, M40, M50 Final Drive", pp. 1–13.

"Parts Manual", Serial No. ESM245–207–6955, Jan./Feb. 1989, (total of 5 pages), 1989 Clark Equipment Company.

"Raymond/Pacer 60, Product Specification Information," Feb. 1, 1991, pp. 17–19, pp. 301–306, Fig. 123–001–483(C)—R.H. 123–001–485(C)—L.H. (13 pages total).

"Crown Series RC Service & Parts Manual," Model 30RCTT, Serial No. A184785, Crown 1980 PF–6239–1 to 6239–5, printed in U.S.A.

"Schaeff Parts Manual Power Group", Model 6832001, Drive Unit Assembly, 4 pages, Rev. Mar. 15, 1993.

*Primary Examiner*—Brian L. Johnson
*Attorney, Agent, or Firm*—Natter & Natter

[57] ABSTRACT

A drive train assembly for motorized vehicles, for example lift trucks. The rotational movement of the output shaft of a motor, for example an electrical motor, is transmitted to a drive wheel by a single drive shaft having at one end a gear interface assembly consisting of a gear on the end of the output shaft and a gear on an end of the drive shaft, and at the other end of the drive shaft by a second gear interface assembly consisting of a gear on the drive shaft and a gear fixedly mounted on the inside of the rim of the drive wheel. The drive train assembly allows for strong, reliable transfer of rotational torque to the drive wheel in a compact, non-complex arrangement with a minimum number of drive parts, bearings and gears. The drive wheel is independently rotatably supported on a spindle mounted to the chassis of the vehicle and bears a majority of the external load and stresses, relieving the drive train assembly of a substantial amount of such load and stresses. The assembly contributes to other important lift truck design considerations, such as mast placement, counterbalance requirements, and right angle stack.

15 Claims, 3 Drawing Sheets

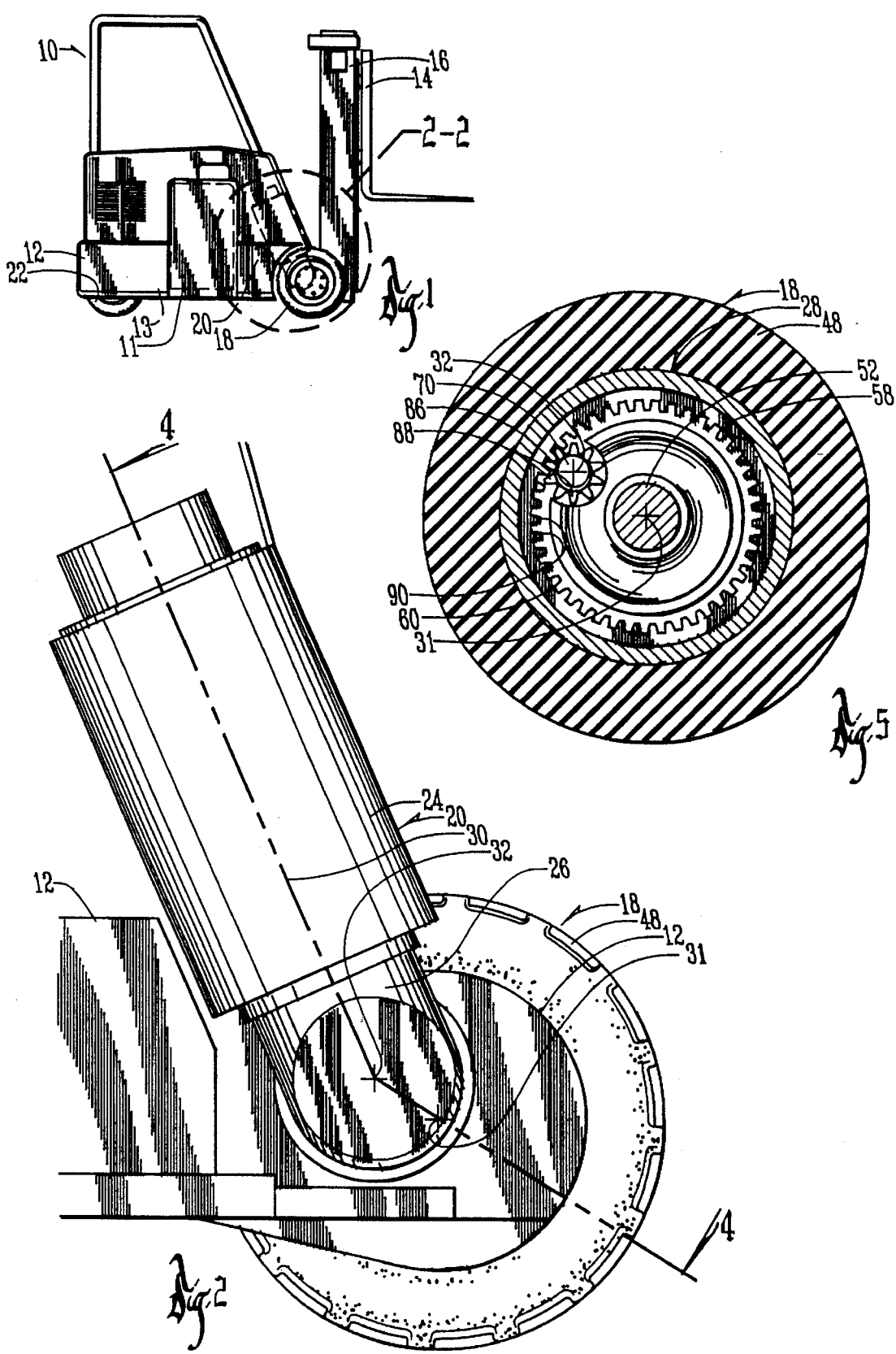

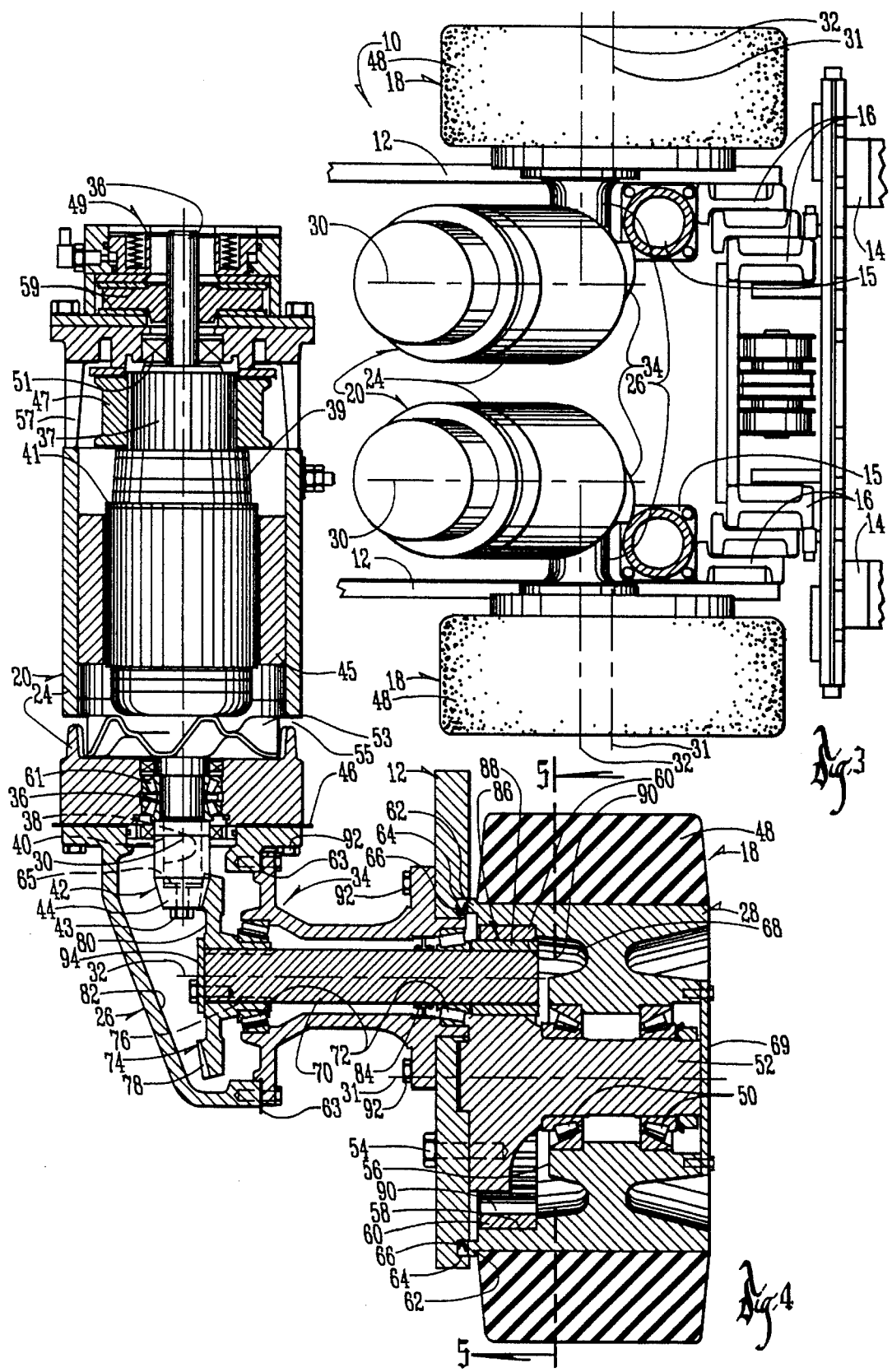

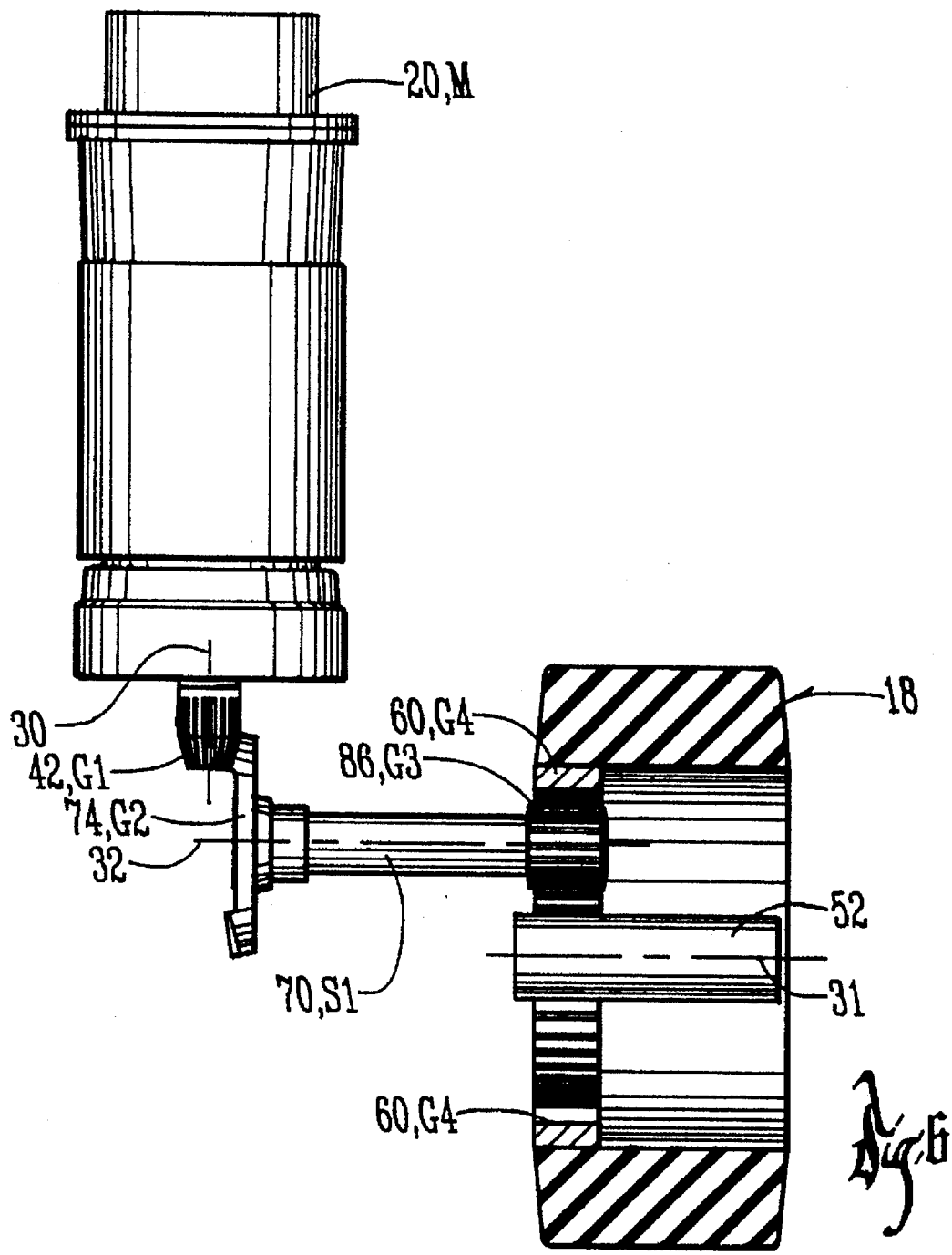

DRIVE TRAIN ASSEMBLY

This is a divisional of application(s) Ser. No. 08/188,535 filed on Jan. 26, 1994 and now abandoned.

BACKGROUND OF THE INVENTION

Field of the Invention

The present invention relates to drive train assemblies, and in particular, drive train assemblies for motorized vehicles including, for example, lift trucks.

Problems in the Art

1. Vehicles in General

Some drive train design considerations or problems are common to many motorized vehicles, regardless of their intended use. The weight of the drive train is usually an important consideration. With heightened awareness of energy consumption, most designers strive to minimize the weight and complexity of the drive train. The number of component parts is a consideration which is often interrelated with the drive train weight and complexity. Of course, the above considerations impact the cost of the drive train and ultimately the vehicle.

Wherever power is transmitted, heat seems to be a byproduct, but excessive heat can break down lubricants and damage parts, especially electrical components. This makes cooling of the drive train and associated components a consideration worthy of some attention. In addition to moving, most vehicles must have the capability to decelerate or stop. This often requires brakes operatively associated with the drive train and/or the wheels. Finally, the size and shape of the drive train assembly is of vital importance to vehicle designers as they try to fit it into a vehicle. Bulkiness of the drive train can adversely affect the overall weight, width, length, and/or height of the vehicle. A bulky drive train forces designers to compromise on size, arrangement, and even the performance or structural integrity of nearby components.

2. Lift Trucks

Lift trucks are relatively specialized vehicles because of their operating environments and intended uses. Lift trucks often operate between aisles of high bay storage racks in warehouses, inside semi-trailers, and in other tight quarters. Because warehouse operators seek to optimally utilize their storage space, racks are often stacked high and the aisles between them are narrow. Though lateral stability considerations might suggest a wide wheel base, narrow aisles and passages often force compromises on lift truck width. Lift truck length can also be crucial in providing it with the required mobility and access to the loads to be carried.

Lift trucks are an unusual species of vehicle because they are purposely designed to carry, and in most cases raise or lower, loads in a cantilevered arrangement. This presents special weight distribution (i.e. balancing) problems. Assuming that the load is lifted at the front of the truck, the weight of that load must be counterbalanced by mass on the vehicle behind the center of gravity. The counterbalance problem is further complicated by the fact that raising or lowering the load on the mast may change the moment arm. Clearly, any weight added for purposes of counterbalancing adds to the overall weight of the lift truck, requires more power, and hurts operating efficiency. If the mass cannot be increased within the allotted space, the length or width of the vehicle may have to be increased.

A frequent consideration for lift trucks is a measurement known in the art as right angle stack. This measurement represents the width of an aisle required for a lift truck plus load to turn perpendicular to the aisle while allowing the lift truck to stack the load into a storage rack. Generally, a longer lift truck will have a longer, and therefore usually less desirable, right angle stack measurement. The wheel base and the proximity of the mast and forks to the wheels is crucial to right angle stack.

The use of lift trucks generally involves the lifting and transporting of heavy loads. The wheels and associated supports must bear not only the weight of the vehicle itself, but also the transported load.

In many lift trucks, axles both drive and support the wheels. It has been found that fatigue failures of these axles occur with unacceptable frequency. The combined dynamic stresses on the axle are sometimes more than the given size cross-section can withstand. Adequate space may not be available to increase the diameter of the axle, thus surface discontinuities constituting stress risers may be unavoidable. In short, the rotating axle may be the weakest link in such drive trains.

The weight of the drive train is an important consideration in a lift truck, but maintaining a safe and proper center of gravity during operation is even more important than the total mass of the vehicle. The placement of heavy components, such as the drive train, has to be optimized relative to the axles so as to minimize the distance from the load bearing axles to the load face.

The size and configuration of the drive train can have a major impact on the balance, counterbalance, weight, and stability of the lift truck and its load. With respect to side-to-side balance, the width of the lift truck and the transverse wheel base must be sufficient to prevent the sideways rolling of the lift truck. It is also desirable to spread the mast uprights as wide as possible so as to achieve the greatest side-to-side mast stability by reducing side-to-side mast deflection. Furthermore, the heavy loads often carried by lift trucks can present fore and aft imbalance problems such as pitching or tipping which require counter-balancing. If, however, the motor and other similarly heavy drive train components are carefully arranged around the powered wheel(s), the balance and counterbalancing of the lift truck can actually be improved.

With current lift truck designs it is often hard to adequately cool the drive train and motor. Typically, the drive train and motor are located near the bottom of the vehicle proximate to the wheels. In this position, the drive train is frequently wedged tightly between components above and around it and the ground underneath it. In this configuration, the motor may not have an internal fan, thereby resulting in poor air circulation resulting in the overheating of the drive motor(s). This overheating of the drive motor(s) can adversely affect the life of the drive motor(s), brake systems and drive unit seals, thereby resulting in premature component failures. As a result the designer may be forced to provide costly external cooling means to address this problem.

The position of the drive train and its motor has an impact on the type of brakes which can be installed. Among the possibilities are locating the brake near the axle, incorporating it into the transmission, or mounting it to the motor.

If a brake must be mounted on a motor which extends horizontally from the drive train, the choice of certain types of brakes may be precluded. With some types of brakes, components are located along the top side of the horizontally disposed motor, making them difficult to service without disassembling a major portion of the drive train. Further, the position and orientation of the horizontally mounted motor complicates service and maintenance of the motor (e.g., motor/drive unit assembly may have to be removed to allow inspection of two rear brushes). Such an extensive tear down is costly and time-consuming.

With the foregoing considerations in mind, it is appropriate to analyze this invention and the efforts of others in the art. Some examples of the multitude of drive train arrangements for lift trucks and other motorized vehicles are set forth in the following United States patents:

| U.S. Pat. No. | Inventors(s) | Date Issued |
| --- | --- | --- |
| 3,186,506 | Leach et al. | 06/01/65 |
| 3,392,797 | Gibson et al. | 07/16/68 |
| 3,424,475 | Gibson | 01/28/69 |
| 3,469,646 | O'Connor | 09/30/69 |
| 3,804,190 | Shaffer | 04/16/74 |
| 3,827,528 | Shaffer | 08/06/74 |
| 3,933,217 | Eichinger | 01/20/76 |
| 3,937,293 | Susdorf | 02/10/76 |
| 4,461,367 | Eichinger et al. | 07/24/84 |
| 4,819,508 | Yamaoka et al. | 04/11/89 |

Some of these patents illustrate drive systems which relate to lift trucks. It is well known in the art that other drive train systems exist for lift trucks. Certain problems and deficiencies with respect to existing lift truck drive train systems will be apparent from the discussion which follows. Before proceeding, however, with a specific discussion of some of these problems and deficiencies, certain terms will be defined to aid in the categorization and analysis of existing lift truck drive designs.

From a functional standpoint, the wheels of a lift truck can be thought of as load wheels, powered wheels, steer wheels, or some combination thereof. Load wheels are generally proximate to the external load which is being lifted, and are therefore close to the loaded vehicle's center of gravity. When the forks are mounted on the front of the lift truck, the front wheels are referred to as the load wheels. Furthermore, some "straddle" style lift trucks utilize base legs which put front wheels under or in front of the external load so that it is supported between both the front and rear (loaded) wheels. The wheel or wheels used for turning the lift truck constitute steer wheel(s). For greatest maneuverability a single steer wheel is often provided at the rear of the lift truck, but dual and/or front steer wheels are also known in the art. Finally, the wheels may be powered by a suitable drive train assembly. Load wheels and even steer wheels are powered as a combination wheel in some lift truck designs. It should be apparent that the particular drive train will vary greatly depending on the other functions which the powered wheel(s) must provide.

U.S. Pat. No. 3,933,217 to Eichinger relates to a drive gear system for motor vehicles where an electric motor is mounted "in-line" or coinciding with the axis of rotation of a wheel. This system compactly positions the mass of the drive train near the wheel. However, when both front wheels of a lift truck are individually driven with this system, the motors extend horizontally toward each other. Clearly the length of one motor is limited by that of the other. This means that the armature stack and therefore power of the motor is similarly limited. A larger diameter motor may be required to achieve the desired torque, since the length of the armature is limited.

With a relatively large diameter motor, little room is left for tucking the masts back and toward the wheels. Either the masts for the forks must be forced closer together or the length of the entire lift truck must be extended so as to allow the spread of the masts in front of the motor and drive train. Furthermore, the whole drive train assembly is difficult to access for maintenance or service. This is especially true of the motor brushes. Because the motor is horizontally disposed and has no room for an integral fan, it is also subject to overheating unless a costly and bulky external fan is provided.

In the Eichinger 3,933,217 drive train assembly, a hub having internal pinion teeth is driven about a stationary axle by a sun gear and a plurality of planetary gears. This relatively complex and expensive arrangement includes an integral brake. Unfortunately, this arrangement compacts the drive train assembly around the wheel to such an extent that the masts cannot be tucked anywhere near the wheel, much less pushed back toward the wheel's axis of rotation.

U.S. Pat. No. 4,461,367 to Eichinger et al. relates to a drive train for a powered steer wheel of a vehicle and shows an electric motor having a pinion mounted to the output shaft thereof. The pinion drives a spur gear which is fixed to the upper end of a bevel-pinion shaft. The lower end of the bevel-pinion shaft matingly engages a bevel ring gear which is fixed to a driven shaft. The driven shaft serves dual purposes as it both supports and drives the wheel rim. Several bearings are required within one half of the drive train housing to support the components.

Because it relates to a single rear-mounted powered steer wheel, this particular drive train has somewhat limited relevance to problems and concerns involved where one or both front wheels are powered. It discloses a fairly compact drive train with most of its mass centered near the wheel. However, if this concentration of drive train mass around the wheel were applied to a front-mounted powered load wheel it would prevent the mast of the lift truck from being tucked close to the wheel or back toward its axis of rotation. Thus, the width to which one could spread the masts and forks would be limited. The driven shaft would be dual or triple purpose and prone to premature fatigue failures due to the combination of static and dynamic loads it would be subjected to. An expensive double row ball bearing is used to support the lower end of the bevel-pinion shaft, but it provides only a modicum of axial support.

U.S. Pat. Nos. 3,392,797 and 3,424,475, which Gibson and Gibson et al. assigned to The Raymond Corporation, relate to steering and suspension systems for motorized lift trucks. However, the Raymond patents show a bulky U-shaped drive train for powered rear-mounted steerable lift truck wheels. A motor is mounted horizontally above each wheel. A plurality of gears, shafts, and supporting bearings translate the rotational power from the motor to a ring gear that is bolted to the inside of the rim.

The overall reliability of such a complex system, having a multitude of moving parts, is not very high. Many of the parts are tightly toleranced gears and shafts which are difficult and expensive to manufacture. Although most of the mass is positioned proximate to the wheel, a large housing is needed to hold the many reduction gear train components. The housing protrudes toward the center of the vehicle and transversely to the axis of rotation of the wheel. If two such drive systems were used as powered front-mounted load wheels, a complex and unacceptably bulky drive train results. The motor may even unacceptably protrude from or overhang the wheels. This drive train also has the overheating, brake access, and brush access problems which have been discussed above as being associated with a horizontally mounted motor.

U.S. Pat. Nos. 3,804,190 and 3,827,528, which Shaffer assigned to Towmotor Corporation, relate to, among other things, drive train assemblies for lift trucks. Dirigible wheels are rotatably mounted on a stationary spindle. An internal ring gear in the drum is shown to be driven by a horizontally disposed motor through a complex clutch and gear arrangement. This drive train is bulky, precluding effective tucking of the masts. Maintenance of the motor and any associated brake is difficult.

Although the above discussion of the background of the art is rather lengthy, it is by no means exhaustive. It serves to indicate some of the many problems, tradeoffs, and compromises faced in the manufacturing of drive train assemblies for lift trucks. It should be apparent that the efforts of others skilled in the art leaves considerable room for improvement. A compact, reliable, and economical drive train assembly which will not unduly compromise other important vehicle design objectives is needed. This applies to a variety of vehicles, including but not limited to lift trucks. Although vehicles other than lift trucks have not been discussed in detail, those skilled in the art will appreciate that analogous problems exist for other types of vehicles and the present invention is readily applicable to them.

It is therefore a principal object and advantage of the present invention to provide a drive train assembly which improves over the state of the art and addresses the deficiencies in the state of the art.

Other objects and advantages of the present invention include:

(1) A strong, durable, reliable power transmitting linkage between motor and powered wheel, even in the environment of such things as lift trucks and the like.

(2) A non-complex combination of components having a relatively small number of parts, especially shafts, bearings and gear sets.

(3) Component support, in the form of bearings of sufficient size and capacity to handle the forces that can be experienced in such drive trains, as well as design combinations of components which redistribute and redirect potentially harmful forces.

(4) Advantageous size and configuration to minimize the space consumed by the drive system, including the drive train.

(5) Improved balance and counterbalance capabilities based on the spatial structure of the drive train.

(6) Advantageous size and strength of individual components of the drive system to minimize overall size, weight, complexity and cost.

(7) Advantageous size and configuration for purposes of convenient and economical maintenance and placement, and cooperation with, associated parts of the vehicle, for example, brakes, motors, masts, lifts, etc.

These and other objects, features, and advantages of the invention will become more apparent with reference to the accompanying specification and claims.

SUMMARY OF THE INVENTION

The invention includes a drive train assembly that combines effective, reliable motor/drive train and drive train/drive wheel interfaces with few gear transitions, bearings, and shafts for a simple, compact overall construction. A single drive shaft transfers rotary power from the motor to the drive wheel utilizing first and second gear sets associated with each end of the shaft. A first gear set between the motor and the drive shaft transfers rotary motion of the output shaft of the motor from generally a vertical plane to a generally horizontal axis containing the drive shaft. The second gear set utilizes a drive gear on the drive shaft which meshes with a gear mounted to the inside of the rim of the drive wheel.

The drive wheel itself is rotatably mounted on a strong stationary spindle mounted to the framework of the lift truck. The stationary spindle is, therefore, separate and distinct from the drive shaft.

Additional features of the invention will be described in detail elsewhere in this description. It is again noted that while this description is particularly related to the drive train assemblies for lift trucks, it has applicability to drive train assemblies and drive systems for other types of motorized vehicles.

BRIEF DESCRIPTION OF THE DRAWINGS

FIG. 1 is a side elevational view of one example of a vehicle, here a lift truck, which can include a drive system according to the present invention.

FIG. 2 is an enlarged isolated view of the portion of FIG. 1 identified by line 2—2, but showing in an exposed fashion, a drive motor and drive train according to a preferred embodiment of the present invention.

FIG. 3 is a top plan view of FIG. 2, showing in this example first and second drive motors providing rotational power through corresponding drive train assemblies to respective drive wheels according to a preferred embodiment of the present invention.

FIG. 4 is a sectional view taken along line 4—4 of FIG. 2 showing the interior components of a drive train according to the invention.

FIG. 5 is a sectional view taken through an entire drive wheel, at the position of line 5—5 of FIG. 4, showing the distinct positions of the drive gear and support component(s) for the drive wheel of this invention.

FIG. 6 is a simplified diagrammatical depiction of the components of the drive train of FIG. 4.

DETAILED DESCRIPTION OF THE PREFERRED EMBODIMENT

A. Overview

To assist in an understanding of the invention, a preferred embodiment will now be described in detail. This preferred embodiment is exemplary only and is not intended to nor does it specifically limit the scope of the invention.

The appended figures will be referred to frequently in this description. Reference numerals or letters are used in the drawings and this description to indicate certain parts or locations in the drawings. The same reference numerals or letters will be used to indicate the same parts or locations in all of the drawings unless otherwise indicated.

The description will begin with a general discussion of the environment of the specifically described preferred embodiment, followed by an identification of the salient parts of the preferred embodiment. This will in turn be followed by a brief discussion of the operation of the preferred embodiment in its intended environment, as well as a discussion of options and alternatives with respect to the preferred embodiment.

B. General Environment of the Preferred Embodiment—Lift Trucks

The drive train assembly of the preferred embodiment of the invention can be utilized in lift truck 10, as depicted in FIG. 1. As is well known in the art, lift truck 10 includes a chassis 12, which houses operational controls and provides a support platform for a vehicle operator. A lift 14 having forks or other attachments suitable for the particular lifting task is mounted to the front of lift truck 10. Lift 14 can be raised or lowered hydraulically or by other conventional means along mast 16 at the front of lift truck 10. Mast 16 can be tilted rearwardly in a conventional hydraulic manner to avoid spilling loads from the front of lift 14.

The present invention is adaptable for use on vehicles powered by electricity, fossil fuels, or other conventional energy sources. In the example of the preferred embodiment, chassis 12 includes a battery compartment 11 for housing a battery 13 that extends substantially across lift truck 10. Although the battery itself is conventional and well known in the art, it should be understood that when room for the operator to stand is left behind it, placement of the battery is a significant limitation on the size of the drive train assembly. This limitation should be apparent from FIG. 1.

In this embodiment, truck 10 has two front-mounted load bearing and powered drive wheels, one on either side, each driven by a separate electric motor. FIG. 1 shows the drive wheel/electric motor combination for one side. The drive wheel is designated at 18 and the motor at 20. A single rear wheel or, alternatively, two wheels 22 exist at the rear of truck 10 and can constitute the steering wheel(s). In certain cases, however, one or both drive wheels 18 can constitute a steering wheel or the rear steering wheel(s) can be driven.

Therefore, FIG. 1 shows the overall structure of lift truck 10, including approximate relational size and orientation of motors 20 and drive wheels 18 with regard to the rest of lift truck 10.

FIG. 2 shows, in an enlarged and exposed fashion, motor 20 and drive wheel 18 on the side opposite those shown in FIG. 1. Motor 20 includes a multi-piece motor housing 24 which is mounted to a drive train housing 26 of a train 34 that extends to the inside of rim 28 (see FIG. 4) of drive wheel 18. It can be seen that this combination takes the rotary power of motor 20, being supplied basically along axis 30, and transmits it at a right angle along a horizontal axis 32 of the drive train (represented at point 32 in FIG. 2 see also FIGS. 3–6), to drive wheel 18 which then rotates about a parallel axis 31 (represented in FIG. 2 as point 31; see also FIGS. 3–6) of its stationary supporting spindle 52 (see FIG. 4). In this manner, the rotary power of motor 20 is converted to tractive effort at drive wheel 18.

FIG. 3 provides a top exposed view of the interior of chassis 12 showing both left and right drive wheels 18 and motors 20. For purposes of simplicity, the remainder of the description will describe in detail one combination of motor 20, drive wheel 18 and the connecting drive train assembly (designated generally at 34). The other such combination is basically a mirror image of the same and operates in a substantially identical manner.

The drive train 34 between each motor 20 and drive wheel 18 is shown generally in FIG. 3. FIG. 3 shows how a combination according to the preferred embodiment allows a relatively compact drive system to be nestled in the front of chassis 12 of truck 10. Motor 20 can be placed relatively near its associated drive wheel 18, even though it extends in substantially a vertical plane which is normal to the axis through drive train 34 represented at 32, so that both motors 20 can be moved towards opposite sides of lift truck 10 to assist in balancing lift truck 10. Stated a different way, motors 20, which are of substantial weight, can be moved away from the center of lift truck 10 and towards drive wheels 18 (or the sides of lift truck 10) which assists in balancing lift truck 10 under the various load conditions encountered during its use. FIG. 3 also shows hydraulic cylinders 15 for masts 16 can be nested rearwardly and between wheels 18 a substantial amount. This is facilitated by motors 20 being disposed at right angles to the rotational axes of the wheels (as opposed to being in-line with those axes). It is also facilitated by the drive trains 34 being engaged to the interior of rims 28 in a fashion that axes 32 are spaced rearwardly from axes 31, and motors 20 are angled upwardly and rearwardly. These factors assist in reducing the amount of counter-balancing needed for truck 10 as well as allow wide mast 16 spacing and other placement of other components to help with balancing.

Specifics of the preferred embodiment of the invention can be seen at FIG. 4. Motor 20 includes a motor output shaft 36 which extends from motor housing 24 to a distal end 38 that in this embodiment includes crowned splines 40. A transfer or pinion gear 42, with an interior bore which includes longitudinal grooves or splines that mate with splines 40 of distal end 38 of output shaft 36, is secured against axial movement by bolt 43 or by other components such as are well known in the art. Pinion gear 42 includes spiral beveled gear teeth 44 around its exterior. Such spiral beveled gear teeth 44 are not specifically illustrated, but they are well known to those skilled in the art.

It should be understood that the configuration of the drive train is necessarily interrelated with that of the motor 20 driving it. As seen in FIG. 4, the shape and orientation of the drive train 34 of the present invention provides an opportunity to utilize a longer armature stack in the motor 20 having higher torque and power. Alternately, if higher torque and power are not desired, similar torque and power could be achieved with a smaller diameter motor. A smaller diameter motor leaves more room for the mast to be pushed and/or tilted back.

Motor 20 is of the direct current (DC) type and has a centrally disposed armature 39 drivingly connected to output shaft 36. Windings 41 and magnets 45 operably surround armature 39. At the top of armature 39, a conventional commutator 37 is attached to output shaft 36. A plurality of conventional brushes 47 are operatively positioned near the top of motor 20 around the commutator 37. With prolonged operation of motor 20, these brushes are subject to wear and therefore require periodic maintenance or replacement. The position and orientation of motors 20 allows convenient access to brushes 47 and also brakes 49 for maintenance.

A hydraulic disc brake 49 is operably connected to the end of output shaft 36 at the top of motor 20. Brake pads 59 are also subject to wear and require periodic maintenance or replacement. A fan 53 is attached to output shaft 36 near its lower or distal end 38. When driven by the output shaft 36, fan 53 circulates air downwardly through the motor housing 24 from an upper opening 57 to a lower opening 55. Cooling is thereby effectively achieved.

Shaft 36 is supported at two locations in motor housing 24 by a total of three bearings. At the lower end of output shaft 36, two tapered roller bearings 61 are installed back-to-back in motor housing 24 to support the shaft for rotation. Note in FIG. 4 that these back-to-back tapered roller bearings are designed and installed so as to fix the position of shaft 36 vertically (hereinafter axially) as well as horizontally (hereinafter radially). By controlling the axial position or protrusion of the shaft in this manner one can dimensionally control the axial position of pinion gear 42 attached thereto with greater accuracy. One or more shims 65 are placed inside pinion gear 42 at its point of abutment with distal end 38 of shaft 36. Shim(s) 65 control the pressure or axial preload placed on tapered roller bearings 61. As will be discussed later, the axial position of the pinion gear 42 is crucial to proper pinion gear 42/beveled gear 74 interface or meshing. At the upper end of output shaft 36 a single row ball bearing provides radial support, but lets the shaft float axially to compensate for thermal expansion or contraction.

As shown in FIGS. 3 and 4, the present drive train configuration allows motor 20 to be positioned in a generally upright but somewhat backwardly tilted position. As shown in FIGS. 1 and 3, a motor 20 associated with each drive wheel 18 is set back and reclined from the vertical plane through axis 32. This provides room for each hydraulic cylinder 15 which raises and lowers telescoping masts 16 such as are known in the art (each mast 16 is comprised of nested I-beams which extend vertically for vertical extensions of lift 14). The result is that the associated lift 14 can be tucked rearwardly and closer to the drive wheels 18. By simple physics, the closer the load on lift 14 can be brought to the axis 31 of the wheels, the less counterbalancing weight must be added to the rear of the lift truck and/or the more the length of the vehicle can be shortened. As a result, a vehicle equipped with the drive train assembly of the present invention has a better right angle stack rating than a similar vehicle that is not so equipped. The reclining of the motors 20 accommodates a similar tilting back of the lift 14 to offset deflection under heavy loads and helps prevent the load from slipping from the front of the lift 14. It can be recognized that other generally right angle configuration drive trains do not so efficiently accommodate the surrounding components.

Mounting motor housing 24 to a planar motor end of the drive train housing 26 in a generally reclined vertical position, as shown in FIG. 4, allows brake 49 to be mounted to the top of motor 20. This provides greater ease of accessibility to the brake for maintenance purposes. The motor brushes and bearings are likewise easily accessible. In many cases, the motor need not be removed first in order to access the part being serviced. Furthermore, the whole motor or any part thereof is easily removable without major-disassembly of the drive train, wheels, axles, or other major vehicle components.

A further result is that motor 20 is more efficiently cooled than it would be if it were horizontally mounted. Near the bottom of vertical motor 20, the rotation of internal fan 53 draws outside ambient air into motor housing 24 through upper opening 57. As this air is drawn downwardly toward fan 53, it absorbs heat from motor 20. Finally, fan 53 ejects the heated air back into the surrounding atmosphere through a lower opening 55 in motor 20.

It should be apparent that the above-mentioned results relating to motors 20 are not limited to those of the electric type, but could be applied to hydraulic motors and other types as well. The motor 20 may thus comprise a hydraulic motor or a hydrostatic motor.

Smaller or more powerful electric motors can be installed with this invention. The vertical orientation of output shaft 36 allows flexibility of motor length and diameter. For example, a longer motor could be installed. Further, various diameters for the motor are possible according to choice and need. Expanding the outer dimensions of the motor facilitates the insertion of more powerful internal components to boost the power of the motor. For instance, the longer, relatively large diameter motors 20 of this example can have more windings and/or a larger armature. More torque can be developed and applied to wheels 18. Alternately, if the torque rating is kept constant, the motor size can be reduced, to free up valuable space in the chassis. This flexibility is advantageous to the designer of the vehicle.

It is noted that motor housing 24 is mounted to the planar motor end of the drive train housing 26 in the manner shown in FIG. 4, which can include bolts 92 or other securing components. Shims 46 can be placed at the junction between motor housing 24 and a planar motor end face of the drive train housing 26, to adjust the angular orientation of axis 30 slightly. This allows the mesh of beveled pinion 42 and bevel gear 74 to be adjustable. Proper orientation of axis 30 is critical to providing correct meshing of the beveled gear teeth. Improper orientation can precipitate excessive wear, noise, poor performance, and even premature failure. The present invention provides a simple, convenient, and efficient means of adjustment.

The drive train housing 26 is formed of two mating casings, a generally vertical bevel gear casing and a horizontal drive shaft casing. The casings are joined together in a vertical plane by bolts along planar mating faces. One or more shims 63 may be placed between the mating faces as will be explained hereinafter. The drive shaft casing is rigidly attached to the chassis 12 along a planar vertical end face by a plurality of bolts 92 as illustrated in FIG. 4. The motor 20 is thus rigidly cantilever supported from the chassis 12 by the drive train housing 26.

Drive wheel 18 (see particularly FIG. 4) includes rim 28 upon which a conventional solid rubber or polyurethane tire 48, is mounted. Rim 28 is rotatably supported on a set of two tapered roller bearings 50 on spindle 52, which is in turn mounted to chassis 12 of lift truck 10. As can be seen, spindle 52 is substantial in diameter and therefore in load bearing capacity. The spindle takes up the majority of loading forces that are experienced through drive wheel 18 as a result of operation of lift truck 10. Surface irregularities in the path of the lift truck can cause sudden spikes in the forces spindle 52 must withstand. Adequate spindle diameter is critical to the durability of the drive wheel assembly. The present invention avoids compounding the loads on spindle 52 by not directly loading it with forces associated with the transmission of rotational power to drive wheel 18. Spindle 52 can be connected to chassis 12 by bolts 54 (only one appears in the sectional view of FIG. 4) or other means such as are within the skill of those skilled in the art.

The inner-facing interior 56 of rim 28 contains a bore or an indentation 58 for receiving a wheel gear or internal ring gear 60 which is fixedly mounted by, for example, press fitting. FIG. 4 also shows that protruding flange 62 around rim 28 extends into an annular groove 64 in chassis 12 and leakage of lubricant around flange 62 is prevented by a conventional seal 66. Grease or other lubricant can then be placed and held in cavity 68 of inner-facing interior 56 of rim 28 to provide an isolated supply of lubrication for ring gear 60, as well as roller bearings 50. Tapered roller bearings 50 can be of the sealed variety or cover plate 69 can be equipped with a gasket, o-ring, or other conventional sealing means (not shown) to retain the lubricant. At the left side of drive wheel 18 in FIG. 4, a double lip seal 84 separates the drive wheel lubricant from that of the drive train housing 26.

Rotational power is supplied between output shaft 36 of motor 20 and ring gear 60 in the inner-facing interior 56 of rim 28 through a drive shaft 70, as shown in FIG. 4. Drive shaft 70 is supported in drive train housing 26 by two tapered roller bearings 72 disposed in drive train housing 26 towards opposite ends of shaft 70. Spiral beveled gear 74 is connected by methods known in the art to one end of shaft 70, for example, an integral internal spline or a splined coupling 76 with a bolted plate 94 securing gear 74 axially in place. In the preferred embodiment beveled gear 74 has beveled teeth 78 disposed circumferentially around face 80, which mesh with beveled teeth 44 of pinion gear 42.

It is to be understood that this arrangement allows a margin of error with respect to the assembly and tolerances between components at this interface with motor 20. For example, if pinion gear 42 is positioned slightly too high or too low with respect to beveled gear 74 in the orientation shown in FIG. 4, the beveled intermeshing teeth 44 and 78 are able to compensate to some degree. In the preferred embodiment the teeth 44 and 78 are spiral or helical splines. They can be crowned a bit to facilitate slight adjustment between them. Shims 46 are used to compensate for any vertical (axial) misalignment of output shaft 36 and shims 63 are used to compensate for any horizontal (radial) misalignment.

It is further to be understood that this configuration also advantageously handles forces placed on these components. The beveled nature of teeth 44 and 78 spreads the loads at this gear reduction (i.e. breaks them down into smaller axial and radial components) which are more easily withstood by the nearby supporting components. For instance, higher axial loads on shaft 70 can be withstood because they are effectively dissipated, in a more even and gradual manner, at the beveled gear reduction. Typically, in both in-line and planetary gear type drive train assemblies, the support components must absorb the full axial or radial loads encountered.

Furthermore, the utilization of tapered roller bearings 72 on shaft 70, rather than ball bearings, increases strength, thrust load capacity, and durability of this arrangement.

Cavity 82 of drive train housing 26 can be filled with oil or transmission fluid to lubricate the beveled gear set (pinion gear 42 and beveled gear 74), as well as the roller bearing 72 near beveled gear 74. It should be understood that the gear reduction components in the drive train housing 26 rotate at relatively high speeds when compared to the gear reduction components in rim 28. It is well known in the art that the lubricating needs at these different speed ranges are best satisfied with lubricants of different viscosities. Double lip seal 84 prevents the oil or fluid needed for the relatively high speed gear reduction within the drive train housing 26 from reaching roller bearing 72 adjacent rim 28. Instead, roller bearing 72 and the other relatively low speed components in rim 28 utilize grease separately held in cavity 68 for lubrication. Therefore, lip seal 84 helps provide separate lubrication compartments.

Outward of associated bearing 72, the end of driven shaft 70 opposite to that holding beveled gear 74 includes a drive gear 86 having external and generally axial teeth 88 which mesh with the corresponding teeth 90 of internal ring gear 60 on rim 28. Therefore, the rotational power of output shaft 36 of motor 20 is transferred through only two gear reductions (pinion 42/beveled gear 74 and drive gear 86/internal ring gear 60) and through only one shaft (drive shaft 70).

Spindle 52, handling the majority of the external loads acting on drive wheel 18, relieves drive train assembly 34 of any such loads. As previously discussed, drive trains which utilize an axle for both supporting drive wheel 18 and rotating drive wheel 18, are subject to premature fatigue failures. It can be seen that by utilizing the configuration shown in FIG. 4, the length of drive shaft 70 can easily be varied according to choice or need.

FIG. 5 shows in more detail the cooperation of drive gear 86 and ring gear 60 on rim 28, including the intermeshing of teeth 88 and 90.

Operation of the preferred embodiment has been described above. By referring to FIG. 6 it can be seen that motor 20 (M) has its rotational output (along an axis in a substantially vertical plane) transferred to a drive wheel 18 rotating along an axis in a substantially horizontal plane by gear combination 42, 74 (G1/G2), which rotates a single drive shaft 70 (S1), which in turn drives gear combination 86, 60 (G3/G4). External loads are taken up by axle or spindle 52. The configuration of this invention represents a non-complex system having a minimum number of components, but adequate torque, strength, and reliability.

FIG. 6 also indicates how the entire combination can be produced in a relatively compact relationship which can be advantageously used in vehicles including lift trucks.

C. Advantages, Features, and Options

It can be seen therefore that the invention achieves at least all of its stated objectives and advantages. It will be appreciated that the present invention can take many forms and embodiments. The true essence and spirit of this invention are defined in the appended claims, and it is not intended that the embodiment of the invention presented herein should limit the scope thereof.

For example, motor 20 could be electric, or it could be hydrostatic or some other motive source that generates rotational output.

The precise dimensions of the components can vary within ranges as appreciated by those skilled in the art. The materials of the components also can vary from embodiment to embodiment such as is understood by and within the knowledge of those skilled in the art.

The methods of assembling components can vary. For example, ring gear 60 can be interference fit into indentation 58 in rim 28. Rim 28 can be cast and machined into a configuration wherein the internal ring gear 60 is integral thereto. A cooled (e.g. frozen) gear 60 and heated rim 28 can be pressure fit with one another. A dowel pin or other known fastener could also be used to prevent any relative movement of these parts. Other ways are possible.

The invention can be utilized with motorized vehicles having only one powered wheel, or with vehicles having two powered wheels. It is applicable not only to front wheel drive but also rear wheel drive and all wheel drive vehicles.

This invention is also applicable to lifting devices in which the drive wheel(s) is/are oriented to propel the device across a substantially vertical plane.

We claim:

1. A lift truck including a chassis and a pair of masts at a forward end of the chassis, the chassis including a pair of substantially parallel spaced frame members, a pair of drive wheels, a pair of drive wheel spindles, each drive wheel being mounted for rotation about a spindle, each drive wheel including a gear, a motor associated with each drive wheel and drive means interconnecting each motor to the gear of an associated wheel, means rigidly securing each spindle to a frame member adjacent a forward end of the lift truck along an axis perpendicular to the frame members, the drive means including a drive train assembly, the drive train assembly comprising a drive train housing, each motor including an output shaft and a drive train interconnecting the output shaft of each motor with the gear of each drive wheel, the drive train being carried in the housing, means rigidly securing each drive train housing to one of the frame members, the housing extending laterally from the frame member in a direction parallel to the spindle axis, means for mounting the motor to the housing at a location laterally spaced from the frame member, each motor being rigidly cantilever supported from a respective frame member through a respective drive train housing, each motor having an axis tilted from vertical inwardly relative to the forward end of the lift truck, the drive train comprising a first gear rotating unitarily with the motor output shaft, a second gear drivingly engaging the first gear, a third gear drivingly engaging the drive wheel gear and means drivingly interconnecting the second gear and the third gear.

2. A lift truck as constructed in accordance with claim 1 wherein the drive wheel gear comprises a ring gear.

3. A lift truck as constructed in accordance with claim 1 wherein the means drivingly interconnecting the second gear and the third gear comprises a drive shaft, the third gear rotating unitarily with the second gear.

4. A lift truck as constructed in accordance with claim 3 further including bearing means carried in the housing for supporting the drive shaft, the bearing means comprising tapered roller bearings.

5. A lift truck as constructed in accordance with claim 1 wherein the drive train housing includes a generally vertical first planar face, the housing being mounted to its respective frame member with the first planar face abutting the frame member, the drive train housing including a second planar face, the second face lying in a plane orthogonal to the first planar face, the motor being mounted to the drive train housing at the second planar face.

6. A lift truck as constructed in accordance with claim 1 wherein the motor comprises an electric motor, the motor being contained within a motor housing, the motor housing carrying a cooling fan, the cooling fan being carried in the motor housing.

7. A lift truck as constructed in accordance with claim 1 wherein the first gear comprises a bevel gear and the second gear comprises a bevel gear.

8. A lift truck as constructed in accordance with claim 7 wherein the bevel gears are spirally beveled.

9. A lift truck as constructed in accordance with claim 5 wherein the drive train housing further includes a first casing, the first casing including the first planar face, the housing further including a second casing, the second casing including the second planar face, the housing further including means joining the first and second casings together.

10. A lift truck as constructed in accordance with claim 9 wherein each casing includes a further planar face, the further planar face of each casing mating with one another, the means for joining the casings together including means for joining the further planar faces.

11. A lift truck as constructed in accordance with claim 10 further including shim means, the shim means being positioned between the further faces, whereby adjustment of the drive train for component alignment is facilitated.

12. A lift truck as constructed in accordance with claim 2 further including shim means, the shim means being positioned between the second planar face and the motor, whereby alignment of the gear train is facilitated.

13. A lift truck, the lift truck including a chassis, the lift truck having a forward end, a pair of masts, the masts being positioned adjacent the forward end, a drive wheel, the drive wheel being mounted for rotation about a wheel spindle, the drive wheel including a gear, a motor, the motor having an output shaft, means rigidly fixing the motor relative to the wheel spindle, and a drive train operatively connecting the motor output shaft with the drive wheel gear, the drive train being carried in a housing, the means fixing the motor relative to the spindle comprising the drive train housing, the drive train housing constituting a cantilever support for the motor, the motor having an axis coincident with the axis of the motor output shaft, the drive train housing fixing the motor such that the motor axis is tilted from a vertical position, the motor axis being tilted inwardly from the forward end of the lift truck, the drive train comprising a first gear rotating unitarily with the motor output shaft, a second gear drivingly engaging the first gear, the second gear being fixed to a drive shaft, a third gear fixed to the drive shaft, the drive shaft having an axis parallel to the axis of the spindle, the third gear drivingly engaging the drive wheel gear.

14. A lift truck as constructed in accordance with claim 13 wherein the drive wheel gear comprises a ring gear, the first gear and the second gear comprising spirally beveled gears.

15. In a lift truck having a chassis, a forward end, a pair of masts mounted to the chassis adjacent the forward end of the lift truck, the chassis including a pair of spaced parallel members, a drive wheel, a drive wheel spindle being fixed to one of the chassis members adjacent the forward end of the lift truck, a motor, a drive train interconnecting the motor with the drive wheel, the improvement comprising a cantilever support rigidly fixing the motor relative to the spindle, the cantilever support comprising a drive train housing, the drive train housing carrying the drive train, means rigidly mounting the housing to the one chassis member and means rigidly mounting the motor to the housing at a point spaced laterally from the one chassis member, the motor including a motor axis, an output shaft coaxial with the motor axis, the output shaft being positioned at one end of the motor, the means mounting the motor to the housing engaging the output shaft end of the motor with the motor axis inclined from the housing inwardly, away from the forward end of the lift truck and upwardly away from the wheel, whereby clearance is provided for rearward tilting of a mast adjacent the motor and the motor is readily accessible for disassembly and/or servicing.

* * * * *